US009243489B2

(12) United States Patent
Veeningen

(10) Patent No.: US 9,243,489 B2
(45) Date of Patent: Jan. 26, 2016

(54) SYSTEM AND METHOD FOR STEERING A RELIEF WELL

(75) Inventor: Daniel M. Veeningen, Houston, TX (US)

(73) Assignee: INTELLISERV, LLC, Houston, TX (US)

(*) Notice: Subject to any disclaimer, the term of this patent is extended or adjusted under 35 U.S.C. 154(b) by 657 days.

(21) Appl. No.: 13/617,664

(22) Filed: Sep. 14, 2012

(65) Prior Publication Data

US 2013/0118809 A1    May 16, 2013

Related U.S. Application Data

(60) Provisional application No. 61/558,937, filed on Nov. 11, 2011.

(51) Int. Cl.
*E21B 47/0224* (2012.01)
*G01V 1/40* (2006.01)
*E21B 47/022* (2012.01)
*E21B 7/04* (2006.01)
*E21B 47/02* (2006.01)
*E21B 17/02* (2006.01)
(Continued)

(52) U.S. Cl.
CPC ............ *E21B 47/02208* (2013.01); *E21B 7/04* (2013.01); *E21B 17/028* (2013.01); *E21B 47/02* (2013.01); *G01S 5/22* (2013.01); *G01V 1/48* (2013.01)

(58) Field of Classification Search
CPC ...... E21B 47/02; E21B 47/02208; E21B 7/06; E21B 17/028; E21B 7/046; G01V 1/42; G01V 1/52; G01S 5/22; Y10S 367/911
See application file for complete search history.

(56) References Cited

U.S. PATENT DOCUMENTS 3,282,355 A * 11/1966 Henderson ................... 175/61
3,722,605 A *  3/1973 Isham ........................... 175/40
(Continued)

FOREIGN PATENT DOCUMENTS

EA      007962 B1    2/2007
EP      0138271 A1   4/1985
(Continued)

OTHER PUBLICATIONS

Sperry Drilling Services, "PWD (Pressure White Drilling) Sensor", Aug. 2007 (2 pages).
(Continued)

*Primary Examiner* — Daniel P Stephenson
(74) *Attorney, Agent, or Firm* — Conley Rose, P.C.

(57) ABSTRACT

A system and method for steering a relief well to intersect a previously drilled wellbore. In one embodiment, a system includes a drill string disposed in the relief well and a surface processing system. The drill string includes a plurality of sections of wired drill pipe connected end-to-end, and a bottom hole assembly disposed at a downhole end of the drill string. The bottom hole assembly includes a drill bit, a steering tool configured to direct the drill bit towards a target, and an acoustic sensing tool. The acoustic sensing tool includes a plurality of acoustic sensors configured to detect acoustic signals emanating from fluid flow in a target wellbore. The surface processing system is coupled to the uphole end of the drill string, and is configured to determine a direction to the target wellbore based on the acoustic signals detected by the acoustic sensors.

29 Claims, 6 Drawing Sheets

(51) Int. Cl.
  *G01S 5/22* (2006.01)
  *G01V 1/48* (2006.01)

(56) References Cited

U.S. PATENT DOCUMENTS

| | | | |
|---|---|---|---|
| 4,016,942 A * | 4/1977 | Wallis et al. | 175/45 |
| 4,297,880 A | 11/1981 | Berger | |
| 4,572,322 A | 2/1986 | Mitchell | |
| 4,606,415 A | 8/1986 | Gray, Jr. et al. | |
| 4,711,303 A * | 12/1987 | Koeling et al. | 166/250.01 |
| 5,131,477 A * | 7/1992 | Stagg et al. | 175/40 |
| 5,184,508 A | 2/1993 | Desbrandes | |
| 5,469,736 A | 11/1995 | Moake | |
| 5,887,657 A | 3/1999 | Bussear et al. | |
| 5,934,371 A | 8/1999 | Bussear et al. | |
| 5,959,547 A | 9/1999 | Tubel et al. | |
| 6,233,524 B1 | 5/2001 | Harrell et al. | |
| 6,252,518 B1 | 6/2001 | Laborde | |
| 6,374,913 B1 | 4/2002 | Robbins et al. | |
| 6,415,231 B1 | 7/2002 | Hebert | |
| 6,415,877 B1 | 7/2002 | Fincher et al. | |
| 6,615,933 B1 | 9/2003 | Eddison | |
| 6,648,081 B2 | 11/2003 | Fincher et al. | |
| 6,648,082 B2 | 11/2003 | Schultz et al. | |
| 6,659,197 B2 | 12/2003 | Cooper | |
| 6,670,880 B1 | 12/2003 | Hall et al. | |
| 6,712,160 B1 | 3/2004 | Schultz et al. | |
| 6,717,501 B2 | 4/2004 | Hall et al. | |
| 6,722,450 B2 | 4/2004 | Schultz | |
| 6,725,162 B2 | 4/2004 | Edwards et al. | |
| 6,732,052 B2 | 5/2004 | MacDonald | |
| 6,821,147 B1 | 11/2004 | Hall et al. | |
| 6,830,467 B2 | 12/2004 | Hall et al. | |
| 6,844,498 B2 | 1/2005 | Hall et al. | |
| 6,854,532 B2 | 2/2005 | Fincher et al. | |
| 6,868,920 B2 | 3/2005 | Hoteit et al. | |
| 6,888,473 B1 | 5/2005 | Hall et al. | |
| 6,986,282 B2 | 1/2006 | Cigienec et al. | |
| 7,044,237 B2 | 5/2006 | Leuchtenberg | |
| 7,062,959 B2 | 6/2006 | Kurkjian et al. | |
| 7,082,821 B2 | 8/2006 | Chen et al. | |
| 7,139,218 B2 | 11/2006 | Hall et al. | |
| 7,174,975 B2 | 2/2007 | Krueger et al. | |
| 7,201,221 B2 | 4/2007 | Tubel et al. | |
| 7,207,396 B2 | 4/2007 | Hall et al. | |
| 7,270,185 B2 | 9/2007 | Fontana et al. | |
| 7,284,903 B2 | 10/2007 | Hartog | |
| 7,311,142 B2 | 12/2007 | Fisseier et al. | |
| 7,428,924 B2 | 9/2008 | Patel | |
| 8,570,834 B2 * | 10/2013 | McElhinney | 367/127 |
| 2004/0039466 A1 | 2/2004 | Lilly et al. | |
| 2004/0104797 A1 | 6/2004 | Hall et al. | |
| 2004/0113808 A1 | 6/2004 | Hall et al. | |
| 2004/0145492 A1 | 7/2004 | Hall et al. | |
| 2004/0150532 A1 | 8/2004 | Hall et al. | |
| 2005/0001735 A1 | 1/2005 | Hall et al. | |
| 2005/0092488 A1 | 5/2005 | Rodet et al. | |
| 2005/0092499 A1 | 5/2005 | Hall et al. | |
| 2005/0161215 A1 | 7/2005 | Hall et al. | |
| 2005/0173128 A1 | 8/2005 | Hall et al. | |
| 2005/0194182 A1 | 9/2005 | Rodney et al. | |
| 2005/0194184 A1 | 9/2005 | Gleitman | |
| 2005/0200498 A1 | 9/2005 | Gleitman | |
| 2005/0284663 A1 | 12/2005 | Hall et al. | |
| 2006/0065402 A9 | 3/2006 | Fontana et al. | |
| 2006/0157282 A1 | 7/2006 | Tilton et al. | |
| 2007/0017671 A1 | 1/2007 | Clark et al. | |
| 2007/0029112 A1 | 2/2007 | Li et al. | |
| 2007/0030167 A1 | 2/2007 | Li et al. | |
| 2007/0045006 A1 | 3/2007 | Krueger et al. | |
| 2007/0188344 A1 | 8/2007 | Hache et al. | |
| 2007/0263488 A1 | 11/2007 | Clark | |
| 2007/0272033 A9 | 11/2007 | Jones | |
| 2008/0041576 A1 | 2/2008 | Patel | |
| 2008/0135291 A1 | 6/2008 | Hall et al. | |
| 2013/0118809 A1 * | 5/2013 | Veeningen | 175/45 |

FOREIGN PATENT DOCUMENTS

| | | |
|---|---|---|
| GB | 2254430 A | 10/1992 |
| WO | 2007016687 A1 | 2/2007 |

OTHER PUBLICATIONS

Petrobras Emerging Well Technologies; by Placido, Joao Carlos Ribeiro, et al., Drilling & Well Technology, Oil & Gas Review, 2007 OTC Edition (4 pages).
IADE/SPE 112636; High Speed Telemetry Drill Pipe Network Optimizes Drilling Dynamics and Wellbore Placement, Ali, T. H., et al., 200B (8 pages).
IADE/SPE 112702. The Utilization of the Massive Amount of Real Time Data Acquired in Wired Drillpipe Operations, Olberg, et al., (13 pages).
IADC/SPE 115206, Evolution of Innovative Test Methodology for Evaluation or Hardfacing Materials in both Cased and Open Environments; Chan, Alvaro, et al., SPE International, 2008 (15 pages).
IADC/SPE 112740 Evolution of Drilling Programs and Complex Well Profiles Drive Development of Fourth-Generation Hardband Technology, Chan, Alvaro, et al 2008 (17 pages).
Russian Patent Application No. 2010137427 Office Action dated Nov. 19, 2012 (11 pages).
D. Veeningen, "Novel High Speed Telemetry System With Measurements Along the String Mitigate Drilling Risk and Improve Drilling Efficiency," Proceedings of Brasil Offshore, Jan. 1, 2011, pp. 1-12.
PCT/US2012/064618 International Search Report and Written Opinion dated Sep. 26, 2013.

* cited by examiner

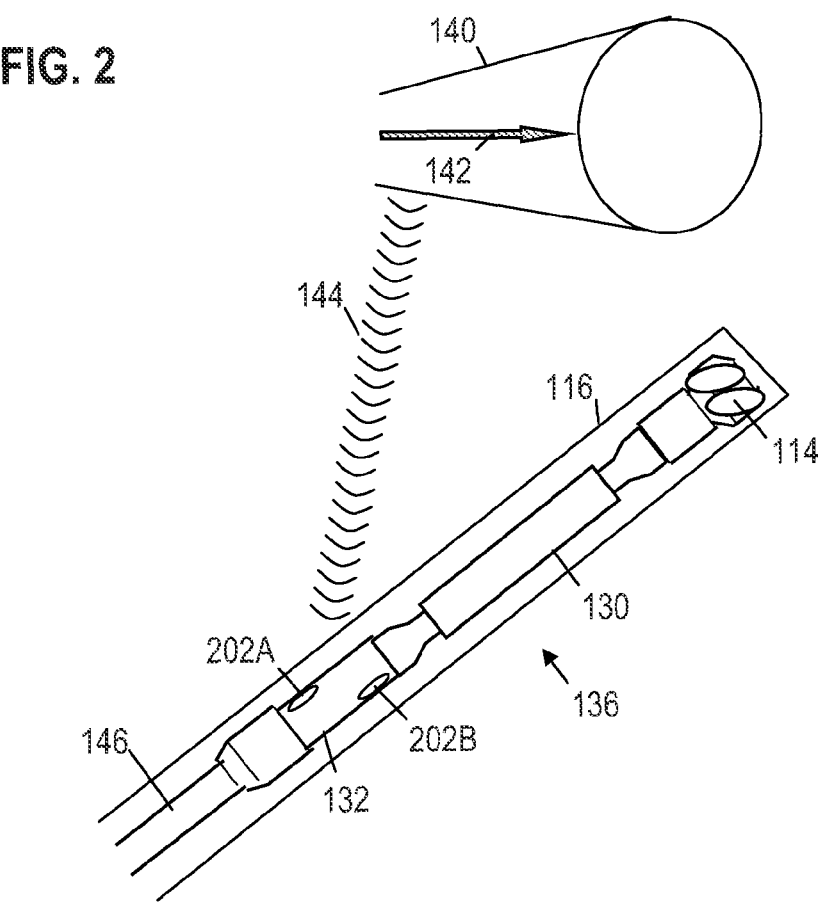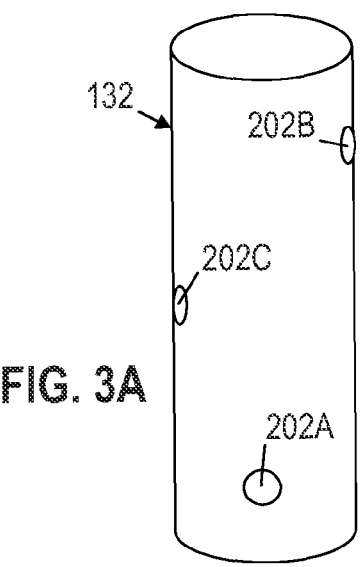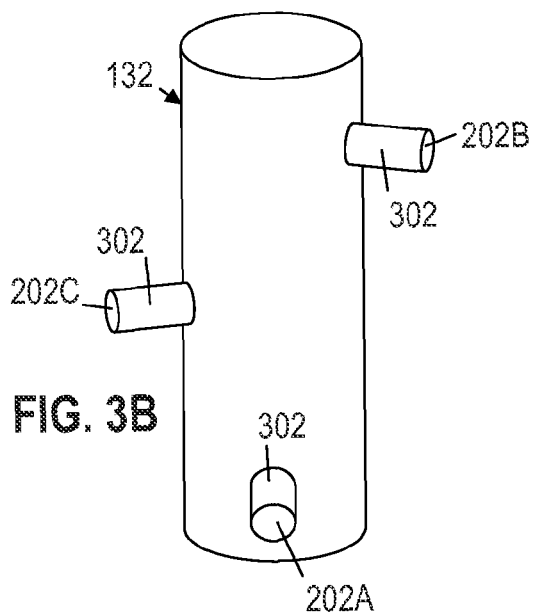

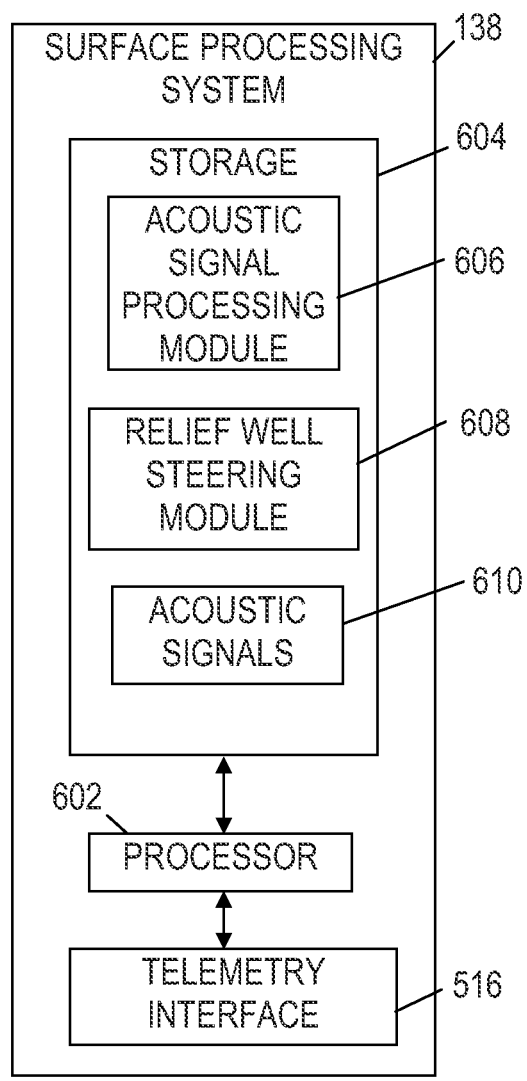

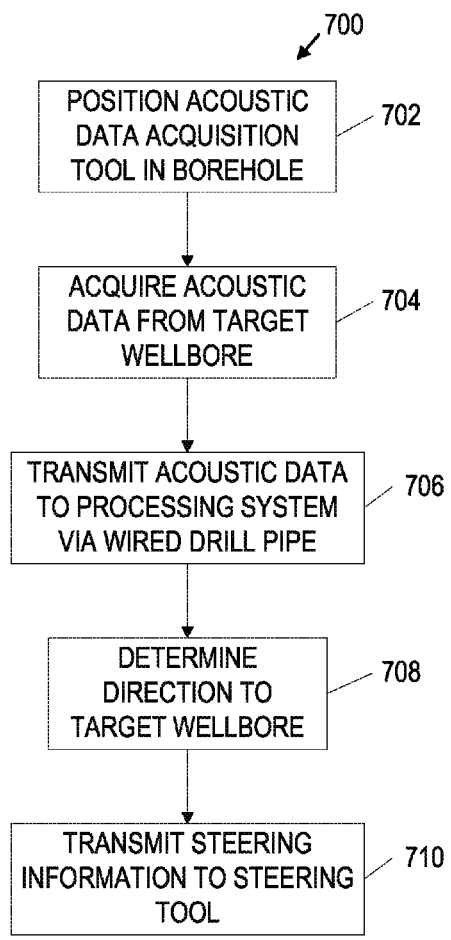

SYSTEM AND METHOD FOR STEERING A RELIEF WELL

CROSS-REFERENCE TO RELATED APPLICATIONS

This application is a non-provisional application claiming priority to provisional application Ser. No. 61/558,937, filed on Nov. 11, 2011, entitled "System and Method for Steering a Relief Well," which is incorporated by reference herein in its entirety.

BACKGROUND

In hydrocarbon exploration and/or production, control of a well may be accidentally lost resulting in a blowout. During the blowout, well fluids flowing to the surface may cause environmental damage and often catch fire. Because economic and environmental loss occur at an increasing rate during the duration of a blowout, great effort is expended in trying to control the well. This usually involves drilling one or more relief wells. A relief well is a well that is drilled at a distance away from the target well (e.g., the blowout well), and is intended to intersect or come within an effective distance of the target well so that mud can be pumped into the target well to prevent formation fluid from reaching the surface.

A relief well must be drilled with great directional accuracy in order for the relief well to intersect the target well. For example, drilling of the relief may begin at location distant (e.g., 1000 feet or more) from the surface location of the target well, and the bore diameter of the target well may be relatively small (e.g., one foot). Consequently, improved techniques for steering a relief well to intersect a target well are desirable.

SUMMARY

A system and method for steering a relief well to intersect a previously drilled wellbore are disclosed herein. In one embodiment, a method for drilling a borehole toward a target wellbore includes positioning a bottom hole assembly comprising an acoustic sensing tool and a drill bit in the borehole. Acoustic data is acquired, by a first acoustic sensor of the tool, from acoustic signals generated by fluid flow in the target wellbore. The acoustic data is transmitted from the tool to a surface processing system via wired drill pipe disposed in the borehole. Based on the acoustic data, a direction from the acoustic sensor to the target wellbore is determined.

In another embodiment, a system includes a drill string disposed in the relief well and a surface processing system. The drill string includes a plurality of sections of wired drill pipe connected end-to-end, and a bottom hole assembly disposed at a downhole end of the drill string. The bottom hole assembly includes a drill bit, a steering tool configured to direct the drill bit towards a target, and an acoustic sensing tool. The acoustic sensing tool includes a plurality of acoustic sensors configured to detect acoustic signals emanating from fluid flow in a target wellbore. The surface processing system is coupled to the uphole end of the drill string, and is configured to determine a direction to the target wellbore based on the acoustic signals detected by the acoustic sensors.

In a further embodiment, apparatus for steering a borehole through subsurface formations toward a target wellbore includes an acoustic signal processing system, an acoustic data acquisition tool, and a plurality of sections of wire drill pipe. The acoustic signal processing system includes a processor and a storage device. The storage device includes instructions that cause the processor to determine, based on acoustic data acquired in the borehole, a direction of travel of a drill bit to intersect the target wellbore. The acoustic data acquisition tool is configured to detect acoustic signals emanating from fluid flow in the target wellbore. The acoustic data acquisition tool is disposed proximate the drill bit, and includes a plurality of longitudinally and angularly offset acoustic sensors. The plurality of sections of wired drill pipe communicatively coupe the acoustic data acquisition tool and the acoustic signal processing system.

BRIEF DESCRIPTION OF THE DRAWINGS

For a detailed description of exemplary embodiments of the invention, reference is now be made to the figures of the accompanying drawings. The figures are not necessarily to scale, and certain features and certain views of the figures may be shown exaggerated in scale or in schematic form in the interest of clarity and conciseness.

FIG. 2 shows the bottom hole assembly of the relief well drilling system acquiring acoustic signals from the target well in accordance with principles disclosed herein;

FIGS. 3A and 3B respectively show an acoustic data acquisition tool with extendable sensor arms retracted and extended;

FIG. 6 shows a block diagram of a surface processing system of a system for drilling a relief well in accordance with principles disclosed herein; and FIG. 7 shows a flow diagram for a method for drilling a relief well in accordance with principles disclosed herein.

NOTATION AND NOMENCLATURE

Figure 1:
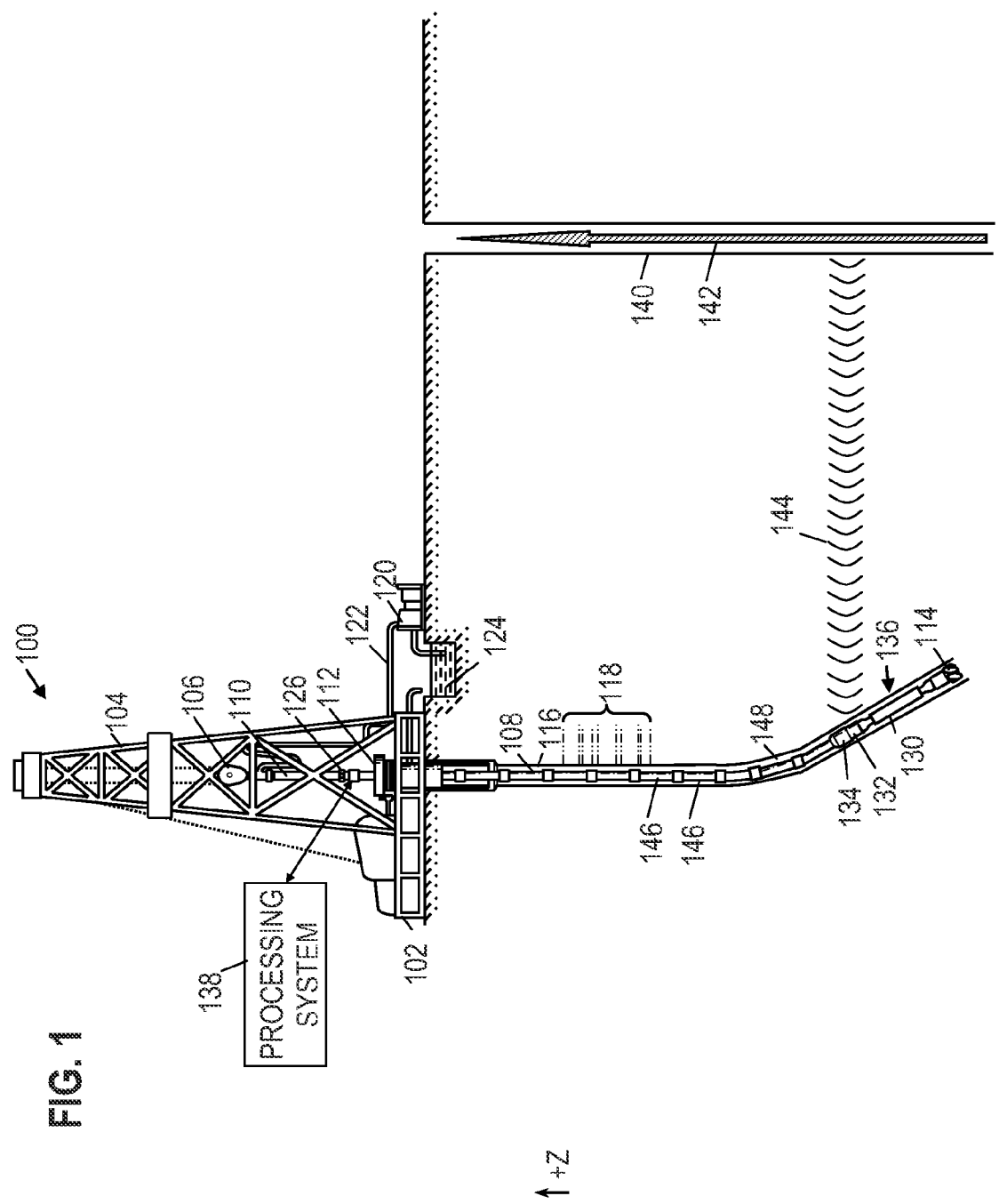
FIG. 1 shows a system for drilling a relief well in accordance with principles disclosed herein.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct connection. Thus, if a first device couples to a second device, that connection may be through direct engagement of the devices or through an indirect connection via other devices and connections. The recitation "based on" is intended to mean "based at least in part on." Therefore, if X is based on Y, X may be based on Y and any number of other factors. Reference to up or down will be made for purposes of description with "up," "upper," "uphole," "upwardly," or "upstream" meaning toward the surface of the well and with "down," "downhole," "lower," "downwardly," or "downstream" meaning toward the terminal end of the well, regardless of the well bore orientation.

DETAILED DESCRIPTION

The following discussion is directed to various embodiments of the invention. The embodiments disclosed should not be interpreted, or otherwise used, to limit the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Acquisition of steering information is important for directing a relief well to intersect with a target well. Conventional relief well steering systems are subject to a number of undesirable limitations and/or drawbacks with regard to acquisition of relief well steering information. In some conventional systems, wireline tools are run downhole to acquire ranging information (i.e., information indicative of the location of the target well relative the relief well that can be used to steer the relief well). However, the use of wireline tools (i.e., tools conveyed downhole via wireline) requires that the drill string be removed from the borehole, and that the wireline tool string be removed from the borehole before drilling can recommence. Consequently, each ranging run using wireline tools delays the progress of the relief well by up to several days while fluid continues to flow from the target well.

Some conventional systems measure active magnetic fields of a target wellbore using logging-while-drilling (LWD) technology to acquire steering information. Such systems do not require that the drill string be tripped out of the borehole to acquire steering information. Unfortunately, current active magnetic ranging LWD tools may be operable only at temperatures below 200 degrees Fahrenheit (F) (e.g., 185° F. upper temperature limit), precluding their use in the majority of deep, and therefore hot and/or overpressured wells. Consequently, conventional systems that use LWD technology to acquire steering information may be limited to use in only a small percentage (e.g., less that 5% in the Gulf of Mexico) of blowout situations.

Embodiments of the present disclosure include a drill string disposed in a relief well and incorporating an acoustic data acquisition tool coupled to a high-speed telemetry network formed with wired drill pipe. The fluids flowing in the wellbore of the target well (e.g., gas and other hydrocarbons) generate acoustic signals. The acoustic data acquisition tool disposed in the relief well captures the acoustic signals and transmits the captured signals to a processing system via the high-speed telemetry network. The processing system determines a direction to the target well relative to the acoustic data acquisition tool and provides steering information to a steering tool disposed in the drill string. Data transfer between the acoustic data acquisition tool and the processing system may occur in real time, and the acoustic acquisition tool may be configured for operation at up to 300° F. or more, allowing for much wider application (e.g., more than 90% of the wells in the Gulf of Mexico) than conventional systems.

FIG. 1 shows a system 100 for drilling a relief well in accordance with principles disclosed herein. In the system 100, a drilling platform 102 supports a derrick 104 having a traveling block 106 for raising and lowering a drill string 108. A kelly 110 supports the drill string 108 as it is lowered through a rotary table 112. In some embodiments, a top drive is used to rotate the drill string 108 in place of the kelly 110 and the rotary table 112. A drill bit 114 is positioned at the downhole end of the tool string 126, and is driven by rotation of the drill string 108 or by a downhole motor (not shown) positioned in the tool string uphole of the drill bit 114. As the bit 114 rotates, it removes material from the various formations 118 and creates the borehole 116 of the relief well. A pump 120 circulates drilling fluid through a feed pipe 122 and downhole through the interior of drill string 108, through orifices in drill bit 114, back to the surface via the annulus 148 around drill string 108, and into a retention pit 124. The drilling fluid transports cuttings from the borehole 116 into the pit 124 and aids in maintaining the integrity of the borehole 116.

In the system 100, the drill string 108 includes a plurality of sections (or joints) of wired drill pipe 146 and a bottom hole assembly 136. The bottom hole assembly 136 includes an acoustic data acquisition tool 132 and a steering tool 130. The steering tool 130 may be any tool used to set the direction of borehole formation for directional drilling, such as a rotary steering tool or a bent housing.

Each section of wired drill pipe 146 includes a communicative medium (e.g., a coaxial cable, twisted pair, etc.) structurally incorporated or embedded over the length of the section, and an interface at each end of the section for communicating with an adjacent section. The communicative medium is connected to each interface. In some embodiments, the interface may include a coil about the circumference of the end of the section for forming an inductive connection with the adjacent section. The high bandwidth of the wired drill pipe 146 allows for transfers of large quantities of data at a high transfer rate. Some embodiments of the drill string 108 may include boosters or repeaters interspersed among the pipe sections 146 to extend the reach of the telemetry network.

The acoustic data acquisition tool 132 includes a plurality of acoustic sensors that detect acoustic signals 144 generated by fluid 142 flowing in the target wellbore 140. The acoustic signals are captured by the acoustic data acquisition tool 132 and transmitted to the surface via the wired drill pipe 146. The high bandwidth of the wired drill pipe 146 telemetry system allows the captured acoustic signals to be transferred to the surface in real time (i.e., at the acoustic signal acquisition rate). At the surface, an interface, such as a slip ring or a wireless transceiver, coupled to the uppermost section of wired drill pipe 146 provides the acoustic signals transmitted by the acoustic data acquisition tool 132 to a processing system 138. The processing system 138 may be located proximate to the platform 102 or remote from the platform 102, and connected to the wired drill pipe network via a local area network, wide area network, the internet, etc.

In some embodiments, the rotation of the drill bit 114 and/or circulation of drilling fluid in the borehole 116 may be temporarily suspended for acquisition of the acoustic signals 144. The drill string 108 may be advanced through a series of rotation angles with acoustic signals acquired at each rotation angle and transmitted to the processing system. For example, drill string 108 rotation may be halted and acoustic signals acquired, followed by a 90° rotation and signal acquisition, followed by a further 90° rotation and signal acquisition, etc., where the rotation angle and the acquired signals are provided the processing system 138.

The processing system 138 receives the acoustic signals, and determines a direction to the target wellbore 140 based on the acoustic signals. The processing system 138 may determine the direction based on the amplitude of the acoustic signals detected by each of the acoustic sensors and/or phase differences (i.e., signal arrival time differences) between the acoustic signals detected by each of the acoustic sensors. The processing system 138 may also determine the distance to the target wellbore 140 based on the amplitude, phase, and/or frequency content of the acoustic signals detected by each of the acoustic sensors. In some embodiments, the processing system 138 may additionally determine the angle of the acoustic data acquisition tool 132 relative to the target wellbore 104 based on the amplitude and/or phase of the acoustic signals detected by each of the acoustic sensors.

The processing system 138 transmits direction control information to the steering tool 130 via the wired drill pipe 146. The direction control information may include an azimuth and/or a vertical inclination defining a direction to which the steering tool 130 adjusts the drill bit 114 and the borehole 116.

While the system 100 is illustrated with reference to an onshore target well, embodiments of the system 100 are also applicable to steering a relief well to intersect with an offshore target well. In such embodiments, the drill string 108 may extend from a surface platform through a riser assembly, a subsea blowout preventer, and a subsea wellhead into the formations 118 to intersect the target well.

FIG. 2 shows a schematic, overhead view of the bottom hole assembly 136 of the relief well drilling system 100 acquiring acoustic signals 144 from the target wellbore 140 in accordance with principles disclosed herein. The acoustic data acquisition tool 132 includes acoustic sensors 202A and 202B which are angularly and longitudinally offset from one another. For example, sensor 202A may be disposed on an opposite side of the tool 132 from the sensor 202B. Consequently, if sensor 202A is closer to the target wellbore 140 than the sensor 202B, there may be difference in amplitude and/or phase of signals detected by the sensors 202A and 202B. A higher amplitude and/or an earlier phase of signals detected by a sensor 202 may indicate that the target wellbore 140 is located in a direction to which the sensor 202 is facing. The acoustic data acquisition tool 132 may be incrementally rotated in the borehole 116 to detect the acoustic signals 144 with changing amplitude and/or phase using the sensors 202 individually and/or in combination. For example, if the sensors 202A and 202B are disposed on opposite sides of the tool 132, then rotating the tool 180° may change the amplitude and/or phase of the signals received at each sensor 202 and confirm the direction to the target wellbore 140.

In some embodiments of the acoustic data acquisition tool 132, the acoustic sensors 202 are affixed to the tool 132 such that the sensors 202 are stationary. In such embodiments, acoustic signals 144 are conducted to the sensors 202 via the drilling fluid in the annulus 148 around the tool 132. In other embodiments, the acoustic data acquisition tool 132 includes members that extend radially from the tool 132. The acoustic sensors 202 may be positioned at the outermost ends of the members, and extension of the members may bring the sensors into contact with the wall of the borehole 116 for improved acoustic coupling.

FIGS. 3A and 3B respectively show an exemplary acoustic data acquisition tool 132 with extendable sensor arms 302 retracted and extended. When acoustic signals 144 are to be acquired, the arms 302 are extended, as shown in FIG. 3B, to place the sensors 202 in contact with the wall of the borehole 116, otherwise the arms 302 are retracted as shown in FIG. 3A. In some embodiments of the acoustic data acquisition tool 132, the arms may extend in other directions, such as at an angle relative to the longitudinal axis of the tool 132, rather than radially as shown in FIG. 3B. The arms 302 may be extended and retracted by electrical, mechanical, and/or hydraulic actuators included in the acoustic data acquisition tool 132 responsive to instructions received via the wired drill pipes 146. The acoustic sensors 202A, 202B, 202C are longitudinally and/or angularly (i.e., circumferentially) offset from one another. While three acoustic sensors are shown in FIGS. 3A-3B, embodiments of the acoustic data acquisition tool 132 may include any number of acoustic sensors 202.

Figure 4:
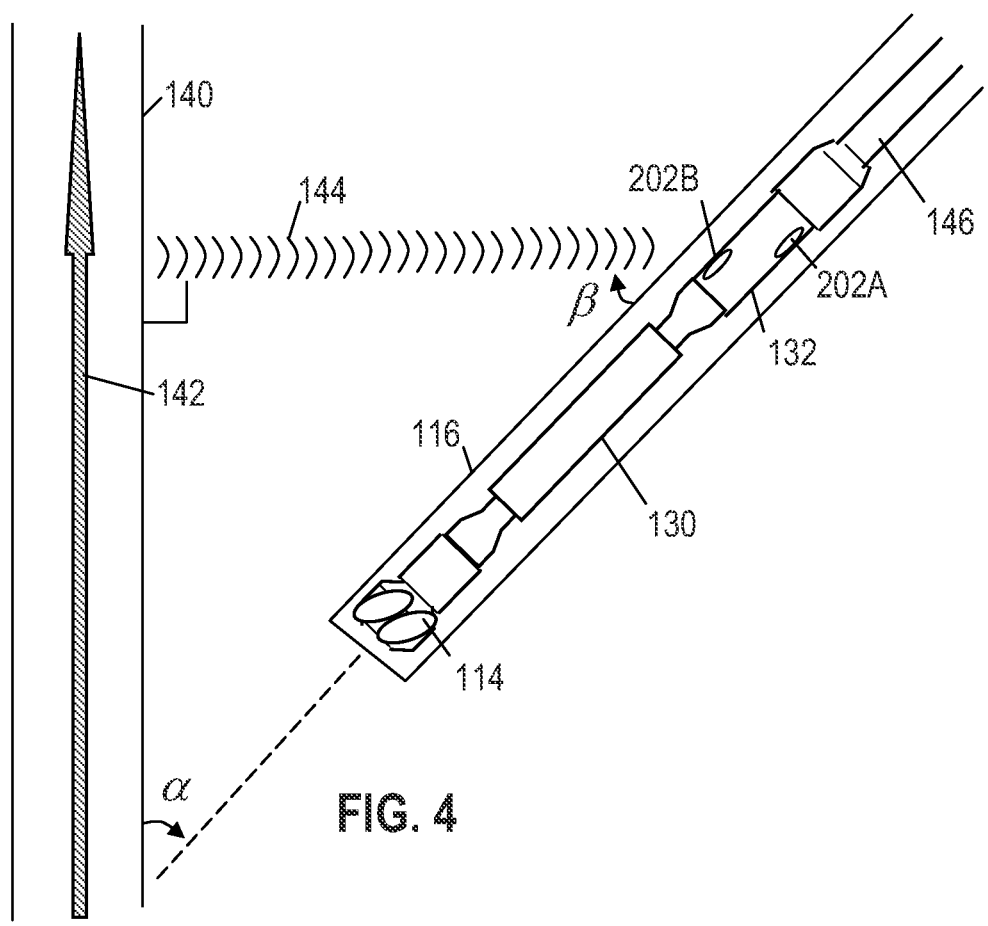
FIG. 4 shows a relief well arranged to intercept a target well at a given angle in accordance with principle disclosed herein.

In some embodiments, the angle or orientation of a sensor 202 may be adjustable and controllable downhole to allow for more accurate determine of the relative angle between the target wellbore 140 and the acoustic data acquisition tool 132. For example, by incrementally adjusting the angle of a sensor 202 relative to the longitudinal axis of the acoustic data acquisition tool 132, an angle of highest amplitude signal reception may be determined. The angle of highest amplitude signal reception may be deemed the angle to the target wellbore 140. For example, FIG. 4 shows the acoustic data acquisition tool 132 positioned to intercept the target wellbore 140 at an angle $\alpha$ where the angle $\alpha$ may be determined based on the angle of the sensor 202B relative to the axis of the tool 132 and $\alpha=90-\beta$ degrees. In some embodiments, equivalent information can be derived based on the time (phase) difference of signal reception by two sensors 202, where the time difference is indicative of the distance traveled by the acoustic signal between the two sensors, and the inclination of a segment joining the two sensors is determined based on the distance. Based on the determined angle between the target wellbore 140 and the borehole 116, the processing system 138 may adjust the direction of the borehole 116 to achieve a desired angle of intersection with the target wellbore 140.

Figure 5:
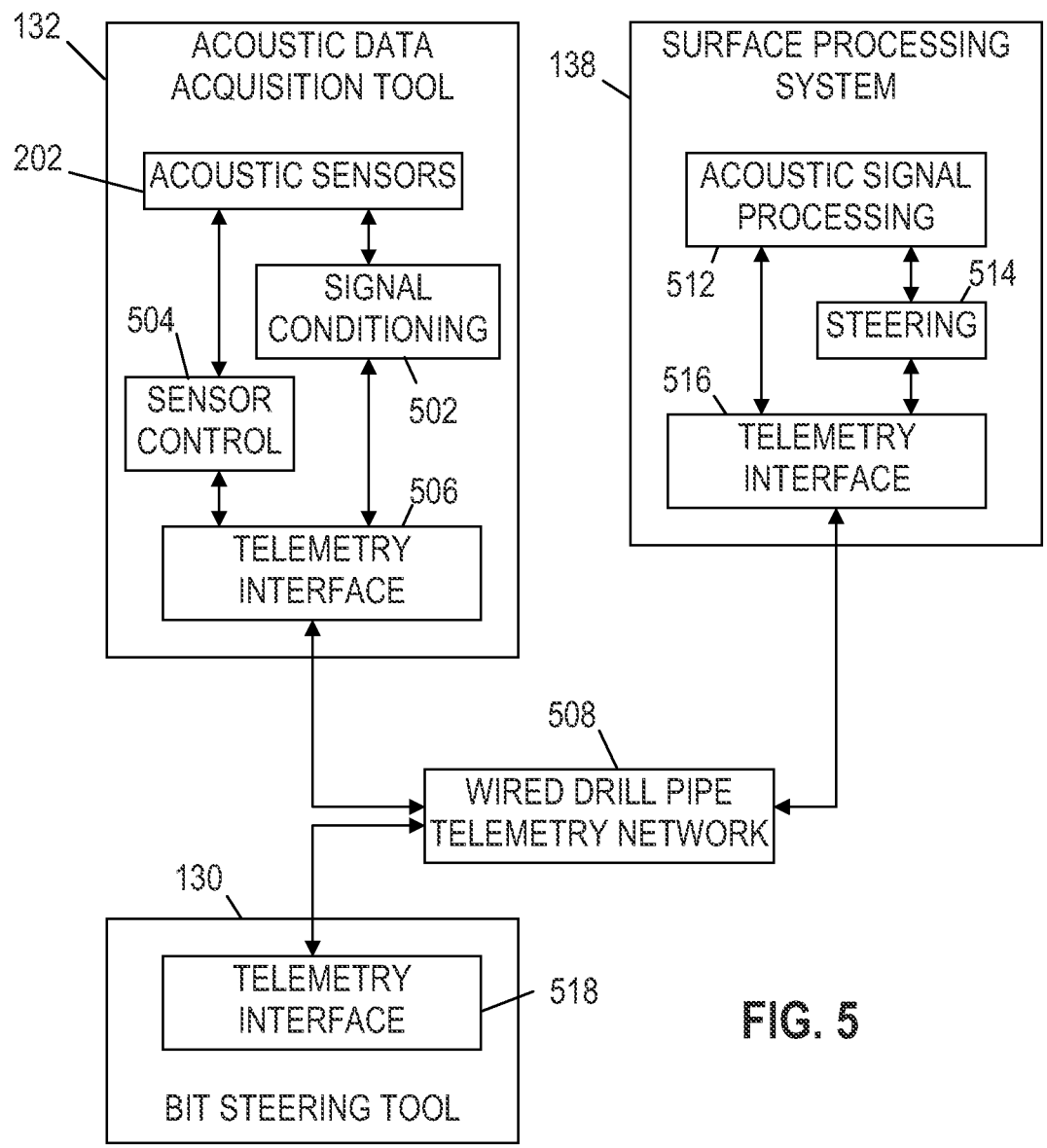
FIG. 5 shows a block diagram of a system for controlling drilling a relief well in accordance with principles disclosed herein.

FIG. 5 shows a block diagram of the system 100 for drilling a relief well in accordance with principles disclosed herein. The processing system 138, which may be at the surface, is coupled to the downhole acoustic data acquisition tool 132 and to the bit steering tool 130 via the wired drill pipe telemetry network 508, which includes a plurality of sections of wired drill pipe 146. The acoustic data acquisition tool 132 includes a plurality of acoustic sensors 202, signal conditioning circuitry 502, sensor control logic 504, and a telemetry interface 506. The acoustic sensors 202 may be accelerometers. In various embodiments, single axis accelerometers and/or multi-axis (e.g., triaxial) accelerometers may be used. The acoustic sensors 202 may also be hydrophones or another type of acoustic sensor known in the art. Various embodiments of the acoustic data acquisition tool 132 may include any number of acoustic sensors 202.

The acoustic sensors 202 are coupled to signal conditioning circuitry 502. The signal conditioning circuitry 502 may include amplifiers, filters, digitizers, etc. for converting acquired acoustic signals to digital form. Digitized acoustic signals are transferred from the signal conditioning circuitry 502 to the telemetry interface 506. The telemetry interface 506 provides the protocol layers (e.g., PHY and MAC layers) that allow data to be transmitted and/or received by the acoustic data acquisition tool 132 via the wired drill pipe telemetry network 508. The telemetry interface 506 may format the digitized acoustic data for transmission and deformat received transmissions. For example, the telemetry interface may apply packetization, encoding, modulation, etc. to the acoustic data in preparation for transmission. The high bandwidth of the wired drill pipe telemetry network 508 allows the captured acoustic signals to be transmitted at the same rate as the rate at which the acoustic signals are acquired. In some embodiments, the telemetry interface 506 may include an inductive coupler through which the transmitted acoustic data is transferred to an adjacent tool or wired drill pipe 146.

The sensor control logic 504 controls various aspects of acoustic sensor 202 operation based, for example, on information (e.g., commands) transmitted to the acoustic data acquisition tool 132 by the processing system 138. The sensor control logic 504 may control the extension of the sensor arms 302, the orientation of the sensors 202, etc. The signal conditioning circuitry 502 may also receive configuration information from the processing system 138.

The bit steering tool 130 may be a rotary steerable tool, a bent housing, or another type of tool used to control the direction of drilling. The bit steering tool 130 may include a telemetry interface 518 for connecting the tool 130 to the wired drill pipe telemetry network 508. The bit steering tool 130 receives direction information from the processing system 138 via the wired drill pipe telemetry network 508. The direction information comprises the direction to intersection with the target wellbore 140 derived from the acoustic signals captured by the acoustic data acquisition tool 132.

The processing system 138 includes acoustic signal processing logic 512, steering logic 514, and telemetry interface 516. The telemetry interface 516 may format data (e.g., instructions for the steering tool 130 or acoustic data acquisition tool 132) for transmission via the wired drill pipe telemetry network and deformat received transmissions. In some embodiments, the telemetry interface 516 may be located in a device remote from the device serving as the processing system 138. For example, a computer serving as the processing system 138 may be connected to a local area network and a bridge device on the local area network may provide access to the wired drill pipe telemetry network 508.

The acoustic signal processing logic 512 analyzes the acoustic signals received from the acoustic data acquisition tool 132. The analysis may include determining the amplitude, phase, and/or frequency content of the acoustic signals captured by each of the acoustic sensors 202 at one or more sensor positions or orientations. Based on the analysis of acoustic signal amplitude and/or phase, the acoustic signal processing logic 512 may determine an orientation of the acoustic data acquisition tool 132 and of the borehole 116 relative to the target wellbore 140. For example, higher amplitude or earlier time of signal incidence may indicate that one acoustic sensor 202 is nearer the target wellbore 140 than a sensor 202 capturing a signal having lower amplitude or later time of incidence. Based on the analysis of acoustic signal amplitude and/or frequency content, the acoustic signal processing logic 512 may determine a distance of the acoustic data acquisition tool 132 and of the borehole 116 from the target wellbore 140. For example, lower frequencies travel farther than higher frequencies, and consequently, the level of high frequency content in the captured acoustic signals may be indicative of the distance between the target wellbore 140 and the borehole 116.

The acoustic data acquisition tool position information extracted from the received acoustic signals is provided to the steering logic 514. The steering logic 514 determines how the direction of the relief well borehole 116 should be adjusted to intersect with the target well 140 based on the position information. The steering logic 514 formulates and transmits steering instructions to the bit steering tool 103 to effect the direction adjustment.

FIG. 6 shows a block diagram of the surface processing system 138 of the system 100 for drilling a relief well in accordance with principles disclosed herein. In FIG. 6 the surface processing system 138 is implemented as a computer. A desktop computer, server computer, blade computer, notebook computer, or other suitable computing device may be used to implement the processing system 138. The illustrated embodiment of the processing system 138 includes the telemetry interface 516, a processor 602, and storage 604.

The processor 602 may include, for example, one or more general-purpose microprocessors, digital signal processors, microcontrollers, or other suitable devices known in the art. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

The storage 604 is a computer-readable storage medium. Software programming that causes the processor 602 to perform the operations disclosed herein, and data analyzed by the processor 602 can be stored in the storage 604. A computer readable storage medium comprises volatile storage such as random access memory, non-volatile storage (e.g., a hard drive, an optical storage device (e.g., CD or DVD), FLASH storage, read-only-memory), or combinations thereof.

The storage 604 contains acoustic signals 610 received from the acoustic data acquisition tool 132, an acoustic signal processing module 606, and a relief well steering module 608. The processor 602 executes the instructions of the acoustic signal processing module 606 to analyze the acoustic signals 610 and determine, based on the analysis, the location of the borehole 116 relative to the target wellbore 140. The processor 602 executes the instructions of the relief well steering module 608 to determine how the path of the relief well borehole 116 should be adjusted to intersect the target wellbore, and to generate instructions provided to the bit steering tool 130 that effect the path adjustment.

FIG. 7 shows a flow diagram for a method 700 for drilling a relief well in accordance with principles disclosed herein. Though depicted sequentially as a matter of convenience, at least some of the actions shown can be performed in a different order and/or performed in parallel. Additionally, some embodiments may perform only some of the actions shown. At least some of the operations of the method 700 can be performed by the processor 602 executing instructions read from a computer-readable medium (e.g., storage 604).

In block 702, the acoustic data acquisition tool 132 is in the borehole 116 along with the other components of the drill string 108. The drill bit 114 is rotating by rotation of the drill string 108 or operation of a downhole motor to extend the borehole 116. The borehole 116 is being drilled with a goal of intersecting the target wellbore 140.

In block 704, the acoustic data acquisition tool 132 acquires acoustic data generated by the flow of fluid 142 in the target wellbore 140. In some embodiments, the drilling of the borehole 116 and the circulation of drilling fluid in the borehole 116 is suspended prior to the initiation of acoustic data acquisition. Extendable arms 302 of the data acquisition tool 132 may be actuated to place the sensors 202 disposed on each arm 302 in contact with the wall of the borehole 116. The positions of the sensors 202 may be changed by, for example, angular advancement of the acoustic acquisition tool 132, and additional acoustic data acquired at each new sensor position resulting from the angular advancement. Some embodiments may also change the angle of a sensor 202 relative to the axis of the tool 132 and acquire acoustic data with each change of angle.

In block 706, the acoustic data acquisition tool 132 transmits the acquired acoustic data to the processing system 138 via the wired drill pipe 146. The high bandwidth of the wired drill pipe 146 allows the acquired acoustic signals to be transmitted to the processing system 138 in real time.

In block 708, the processing system 138 analyzes the acoustic signals received from the acoustic data acquisition tool 132. The analysis may include determining the magnitude, phase, and/or frequency content of acoustic signals acquired by each sensor 202 at each sensor position. Based on the determined differences in acoustic signal magnitude and/or phase across sensors 202, the position and/or angle of the acoustic data acquisition tool 132 and the borehole 116 relative to the target wellbore 140 is determined. Based on the signal amplitude and/or frequency content of the acoustic signals (e.g., over time) the distance from the acoustic data acquisition tool 132 and the borehole 116 to the target wellbore 140 is determined.

In block 710, the processing system 138 computes adjustments to the path of the relief well borehole 116 needed to cause the borehole 116 to intersect the target wellbore 140. The adjustments are computed based on the location, angle, and/or distance values determined by the analysis of the acoustic data. The processing system 138 transmits instructions to the downhole steering tool 130 to effectuate the path adjustments.

The above discussion is meant to be illustrative of principles and various exemplary embodiments of the present invention. Numerous variations and modifications will become apparent to those skilled in the art once the above disclosure is fully appreciated. It is intended that the following claims be interpreted to embrace all such variations and modifications.

What is claimed is:

1. A method for drilling a borehole toward a target wellbore, comprising:
   positioning a bottom hole assembly comprising an acoustic sensing tool and a drill bit in the borehole;
   acquiring acoustic data, by a first acoustic sensor of the tool, from acoustic signals generated by fluid flow in the target wellbore;
   transmitting the acoustic data from the tool to a surface processing system via wired drill pipe disposed in the borehole;
   determining, based on the acoustic data, a direction from the acoustic sensor to the target wellbore; and
   determining a distance to the target wellbore based on frequent content of the acoustic data.

2. The method of claim 1, further comprising:
   transmitting steering information from the surface processing system to the bottom hole assembly via the wired drill pipe;
   steering, based on the steering information, the drill bit towards the target wellbore.

3. The method of claim 1, wherein the positioning the bottom hole assembly comprises disposing the bottom hole assembly in formations having an upper temperature of 300 degrees Fahrenheit or higher.

4. The method of claim 1, further comprising positioning the acoustic sensor against a wall of the borehole by radially and retractably extending the acoustic sensor from the tool.

5. The method of claim 1, further comprising:
   acquiring acoustic data from a second acoustic sensor of the tool; wherein the second acoustic sensor is longitudinally offset from the first acoustic sensor and angularly offset from the first acoustic sensor;
   wherein the determining the direction further comprises computing an azimuth to the target wellbore based on a difference between the acoustic data acquired by the first and second acoustic sensors.

6. The method of claim 5, wherein the difference comprises at least one of an amplitude difference, a phase difference, and a frequency difference.

7. The method of claim 1, further comprising:
   acquiring acoustic data from a second acoustic sensor of the tool; wherein the second acoustic sensor is longitudinally offset from the first acoustic sensor and angularly offset from the first acoustic sensor;
   wherein the determining the direction further comprises computing an angle of intersection relative to an axis of the target wellbore based on a difference between the acoustic data acquired by the first and second acoustic sensors.

8. The method of claim 7, further comprising:
   transmitting steering information to the bottom hole assembly via the wired drill pipe;
   steering, based on the steering information, the drill bit to intersect the target wellbore at a predetermined angle relative to the axis of the target wellbore.

9. The method of claim 1, wherein the transmitting the acoustic data comprises providing the acoustic data to the surface processing system at a same rate as the rate at which the acoustic data is acquired.

10. The method of claim 1, further comprising determining, based on the acoustic data, a distance from the acoustic sensor to the target wellbore.

11. The method of claim 1, further comprising:
    rotating the acoustic tool in the wellbore;
    wherein the acquiring the acoustic data comprises acquiring acoustic data at a plurality of angles during the rotating.

12. A system for drilling a borehole towards a target wellbore, comprising:
    a drill string disposed in a relief well, comprising:
      a plurality of sections of wired drill pipe connected end-to-end; and
      a bottom hole assembly disposed at a downhole end of the drill string, the bottom hole assembly comprising:
        a drill bit;
        a steering tool configured to direct the drill bit towards a target; and
        an acoustic sensing tool comprising a plurality of acoustic sensors configured to detect acoustic signals emanating from fluid flow in the target wellbore; and
    a surface processing system coupled to the uphole end of the drill string, the surface processing system configured to:
      determine a direction to the target wellbore based on the acoustic signals emanating from fluid flow in the target wellbore detected by the acoustic sensors; and
      determine a distance to the target wellbore based on frequency content of the acoustic signals detected by the acoustic sensors.

13. The system of claim 12, wherein the acoustic sensing tool is configured to transmit the detected acoustic signals to the surface processing system, via the wired drill pipe, at a same rate as the rate at which the acoustic signals are acquired.

14. The system of claim 12, wherein the acoustic sensing tool is configured to detect the acoustic signals while disposed in formations having an upper temperature of 300 degrees Fahrenheit or higher.

15. The system of claim 12, wherein the acoustic sensing tool comprises extendable arms configured to position the acoustic sensors against a wall of the relief well.

16. The system of claim 12, wherein the surface processing system is configured to transmit steering information to the steering tool via the wired drill pipe; wherein the steering information directs the drill bit towards the target wellbore, and the steering information is derived from the acoustic signals.

17. The system of claim 12, wherein each of the acoustic sensors is longitudinally and angularly offset from each other of the acoustic sensors.

18. The system of claim 12, wherein the direction to the target wellbore comprises an azimuth to the target wellbore computed based on a difference between the acoustic signals detected by different acoustic sensors.

19. The system of claim 18, wherein the difference comprises at least one of an amplitude difference, a phase difference, and a frequency difference.

20. The system of claim 12, wherein the direction to the target wellbore comprises an angle of intersection relative to an axis of the target wellbore computed based on a difference between the acoustic signals detected by different ones of the acoustic sensors.

21. The system of claim 12, wherein the surface processing system is configured to determine the direction to the target wellbore based on the acoustic signals detected by the acoustic sensors as the acoustic sensors rotate within the relief well.

22. Apparatus for steering a borehole through subsurface formations toward a target wellbore, comprising:
    an acoustic data acquisition tool configured to detect acoustic signals emanating from fluid flow in the target wellbore, the acoustic data acquisition tool disposed proximate a drill bit, and comprising a plurality of longitudinally and angularly offset acoustic sensors; and
    a plurality of sections of wired drill pipe communicatively coupled to the acoustic data acquisition tool; and
    an acoustic signal processing system communicatively coupled to the acoustic data acquisition tool via the wired drill pipe, the acoustic signal processing system comprising:
    a processor; and
    a storage device comprising instructions that cause the processor to:
        determine, based on acoustic data acquired in the borehole, a direction of travel of the drill bit to intersect the target wellbore; and
        determine a distance to the target wellbore based on frequency content of acoustic data acquired by the acoustic sensors of the tool.

23. The apparatus of claim 22, wherein the acoustic data acquisition tool is configured to transmit acquired acoustic data to the processor via the wired drill pipe in real-time.

24. The apparatus of claim 22, wherein the acoustic data acquisition tool comprises extendable arms configured to position the acoustic sensors against a wall of the borehole.

25. The apparatus of claim 22, wherein the instructions cause the processor to transmit, via the wired drill pipe, an adjustment to a direction of drill bit travel to a steering tool disposed proximate the drill bit; wherein the direction of drill bit travel comprises at least one of:
    an azimuth to the target wellbore computed based on a difference between the acoustic signals detected by different acoustic sensors of the tool; and
    an angular offset for intersection relative to an axis of the target wellbore computed based on a difference between the acoustic signals detected by different ones of the acoustic sensors of the tool.

26. The apparatus of claim 22, wherein the acoustic sensors comprise at least one of accelerometers and hydrophones.

27. The apparatus of claim 22, wherein the instructions cause the processor to determine the direction based on at least one of amplitude difference and phase difference between acoustic data acquired by different ones of the acoustic sensors of the tool.

28. The apparatus of claim 22, wherein the instructions cause the processor to determine a distance to the target wellbore based on amplitude of acoustic data acquired by different ones of the acoustic sensors of the tool.

29. The apparatus of claim 22, wherein at least one of the acoustic sensors is angularly adjustable relative to a longitudinal axis of the tool while the tool is downhole.

* * * * *

UNITED STATES PATENT AND TRADEMARK OFFICE
CERTIFICATE OF CORRECTION

PATENT NO. : 9,243,489 B2
APPLICATION NO. : 13/617664
DATED : January 26, 2016
INVENTOR(S) : Daniel M. Veeningen It is certified that error appears in the above-identified patent and that said Letters Patent is hereby corrected as shown below:

Claims
    Column 9, claim 1, line 35, please change "frequent" to "frequency".

Signed and Sealed this
Twenty-sixth Day of April, 2016

Michelle K. Lee
*Director of the United States Patent and Trademark Office*